United States Patent
Tsai (10) Patent No.: US 10,122,240 B2
(45) Date of Patent: Nov. 6, 2018

(54) ELECTRICITY GENERATION DEVICE WITH LOW POWER CONSUMPTION

(71) Applicant: JIE NENG POWER INDUSTRY CO., LTD., Kaohsiung (TW)

(72) Inventor: Chia-Nan Tsai, Kaohsiung (TW)

(73) Assignee: JIE NENG POWER INDUSTRY CO., LTD., Kaohsiung (TW)

( * ) Notice: Subject to any disclaimer, the term of this patent is extended or adjusted under 35 U.S.C. 154(b) by 226 days.

(21) Appl. No.: 15/336,316

(22) Filed: Oct. 27, 2016

(65) Prior Publication Data

US 2018/0123427 A1   May 3, 2018

(51) Int. Cl.
| | |
|---|---|
| *H02K 7/00* | (2006.01) |
| *H02K 7/02* | (2006.01) |
| *H02K 7/08* | (2006.01) |
| *H02K 7/11* | (2006.01) |
| *H02K 7/18* | (2006.01) |
| *B60L 11/16* | (2006.01) |

(Continued)

(52) U.S. Cl.
CPC ............ *H02K 7/1807* (2013.01); *B60L 11/16* (2013.01); *B60L 15/2054* (2013.01); *H02K 7/003* (2013.01); *H02K 7/02* (2013.01); *H02K 7/08* (2013.01); *H02K 7/11* (2013.01); *H02K 53/00* (2013.01); *B60L 2240/486* (2013.01); *H02K 7/18* (2013.01)

(58) Field of Classification Search
CPC ............ H02K 7/02; H02K 7/08; H02K 7/003; H02K 7/11; H02K 7/18; H02K 7/1807; B60L 11/16; B60L 15/2054; B60L 2240/486

See application file for complete search history.

(56) References Cited

U.S. PATENT DOCUMENTS

| | | | |
|---|---|---|---|
| 6,258,001 B1 * | 7/2001 | Wakuta | B60K 6/26 192/3.28 |
| 6,585,066 B1 * | 7/2003 | Koneda | B60K 6/365 180/165 |
| 7,176,648 B2 | 2/2007 | Choi | |

(Continued)

FOREIGN PATENT DOCUMENTS

| | | |
|---|---|---|
| EP | 1793480 A3 | 6/2007 |
| JP | 2012-217265 A | 11/2012 |

(Continued)

*Primary Examiner* — John K Kim
(74) *Attorney, Agent, or Firm* — Birch, Stewart, Kolasch & Birch, LLP (57) ABSTRACT

An electricity generation device with low power consumption has an operating module, a first motor, and a second motor. The electricity is inputted to the first motor to actuate the first motor in a short time, the first motor drives a transmission assembly of the operating module to rotate, and the transmission assembly drives a flywheel of the operating module to rotate. A generator rotor is mounted around the flywheel, and a generator stator is mounted around an inner peripheral surface of the body. The second motor is driven by the transmission assembly. When the flywheel reaches a certain rotational speed, the second motor only needs a low current input to keep operating. That is, the second motor can be continuously operated, and the flywheel generates rotor power, thereby achieving power generation at low energy consumption.

12 Claims, 5 Drawing Sheets

(51) Int. Cl.
*B60L 15/20* (2006.01)
*H02K 53/00* (2006.01)

(56) References Cited

U.S. PATENT DOCUMENTS

| | | | |
|---|---|---|---|
| 7,679,238 B2* | 3/2010 | Nomura | B60K 6/365 |
| | | | 310/100 |
| 8,836,181 B2* | 9/2014 | Iwase | B60K 6/40 |
| | | | 180/65.22 |
| 2002/0012187 A1 | 1/2002 | Nam | |
| 2007/0001460 A1 | 1/2007 | Killian | |
| 2010/0283266 A1 | 11/2010 | Shafiq et al. | |
| 2011/0031827 A1 | 2/2011 | Gennesseaux | |
| 2011/0221294 A1* | 9/2011 | Sato | B60K 6/365 |
| | | | 310/89 |
| 2013/0057117 A1* | 3/2013 | Suzuki | B60K 7/0007 |
| | | | 310/60 R |
| 2013/0221778 A1* | 8/2013 | Kusase | H02K 16/02 |
| | | | 310/78 |
| 2015/0162799 A1* | 6/2015 | Ilan | H02K 7/025 |
| | | | 310/74 |
| 2015/0318758 A1* | 11/2015 | Kalev | H02K 7/025 |
| | | | 310/74 |
| 2018/0123427 A1* | 5/2018 | Tsai | H02K 7/1807 |

FOREIGN PATENT DOCUMENTS

| | | |
|---|---|---|
| JP | 2013-187944 A | 9/2013 |
| TW | M395057 U | 12/2010 |
| TW | M395058 U | 12/2010 |
| WO | WO 2012/098571 A1 | 7/2012 |

* cited by examiner

ELECTRICITY GENERATION DEVICE WITH LOW POWER CONSUMPTION

BACKGROUND OF THE INVENTION

1. Field of the Invention

The present invention relates to an electricity generation device, and more particularly to an electricity generation device with low power consumption that can be operated efficiently.

2. Description of Related Art

Regarding the current demand for global electricity supply, traditional means of power generation have shortcomings. For example, thermal power may cause pollution, and nuclear power is risky with disposal of the nuclear waste highly controversial. Therefore, current power generating devices emphasize on green power and environmental protection. However, the green power generation such as wind power generation or solar cell power generation would be influenced by the weather and therefore is unstable.

In addition, to reduce the emissions of exhaust gas by vehicles so as to avoid fuel combustion emissions causing air pollution and the global warming, the electric vehicles have become increasingly popular in advanced countries and widely accepted by the public.

However, the battery of the conventional electric vehicle is required to be charged for a long time and the charging stations are not widely deployed. Therefore, how to prolong the battery life and how to reduce the loading of the battery are the problems that the electric vehicles have to face.

To overcome the shortcomings of the conventional electricity generation device, the present invention provides an electricity generation device with low power consumption to mitigate or obviate the aforementioned problems.

SUMMARY OF THE INVENTION

The main objective of the present invention is to provide an electricity generation device with low power consumption that can be operated efficiently.

The electricity generation device with low power consumption has an operating module, a first motor, and a second motor. Electricity is inputted to the first motor to actuate the first motor in a short time, the first motor drives a transmission assembly of the operating module to rotate, and the transmission assembly drives a flywheel of the operating module to rotate. A generator rotor is mounted around the flywheel, and a generator stator is mounted around an inner peripheral surface of the body. The second motor is driven by the transmission assembly. When the flywheel reaches a certain rotational speed, the second motor needs only a low current input for operation. That is, the second motor can be continuously operated, and the flywheel generates rotor power, thereby achieving the effect of low-power consumption.

Other objects, advantages, and novel features of the invention will become more apparent from the following detailed description when taken in conjunction with the accompanying drawing.

DETAILED DESCRIPTION OF PREFERRED EMBODIMENT

Figure 1:
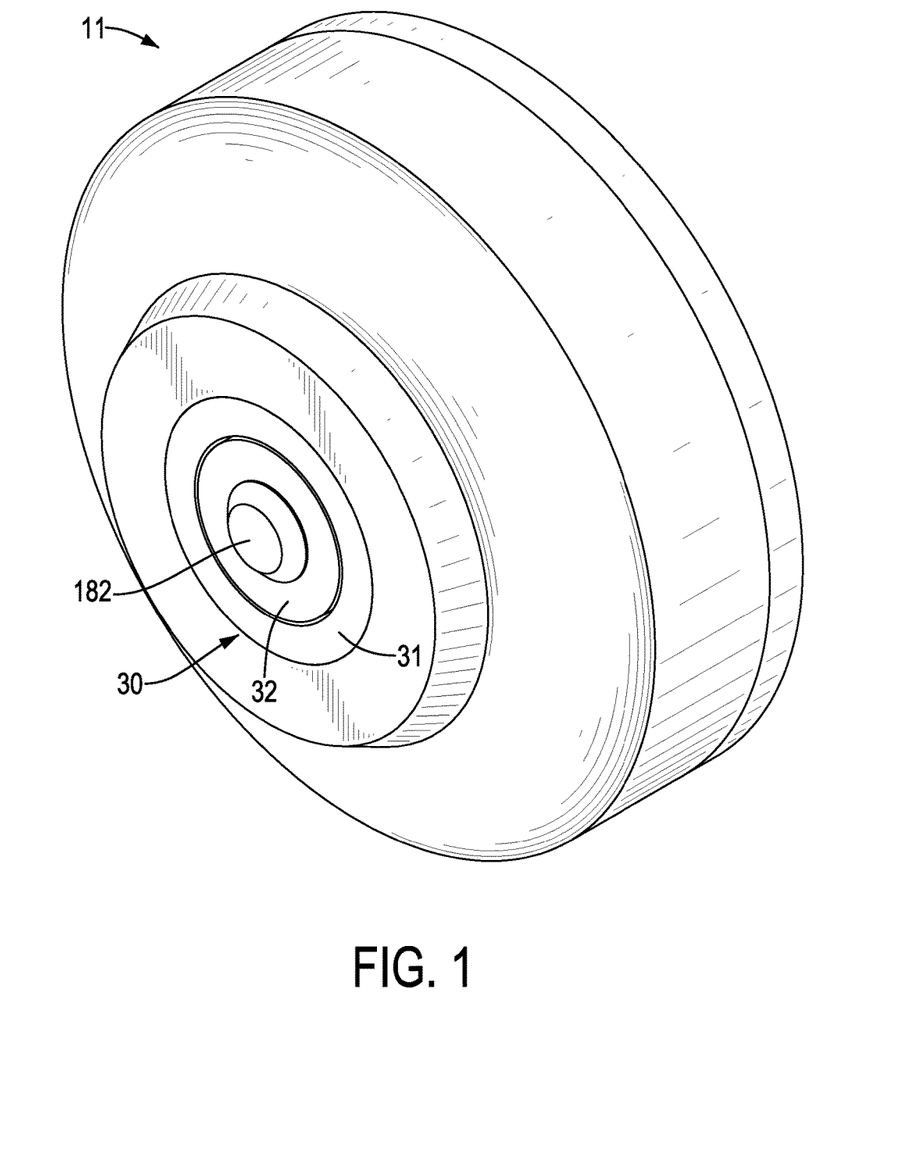
FIG. 1 is a perspective view of an electricity generation device with low power consumption in accordance with the present invention.
Figure 2:
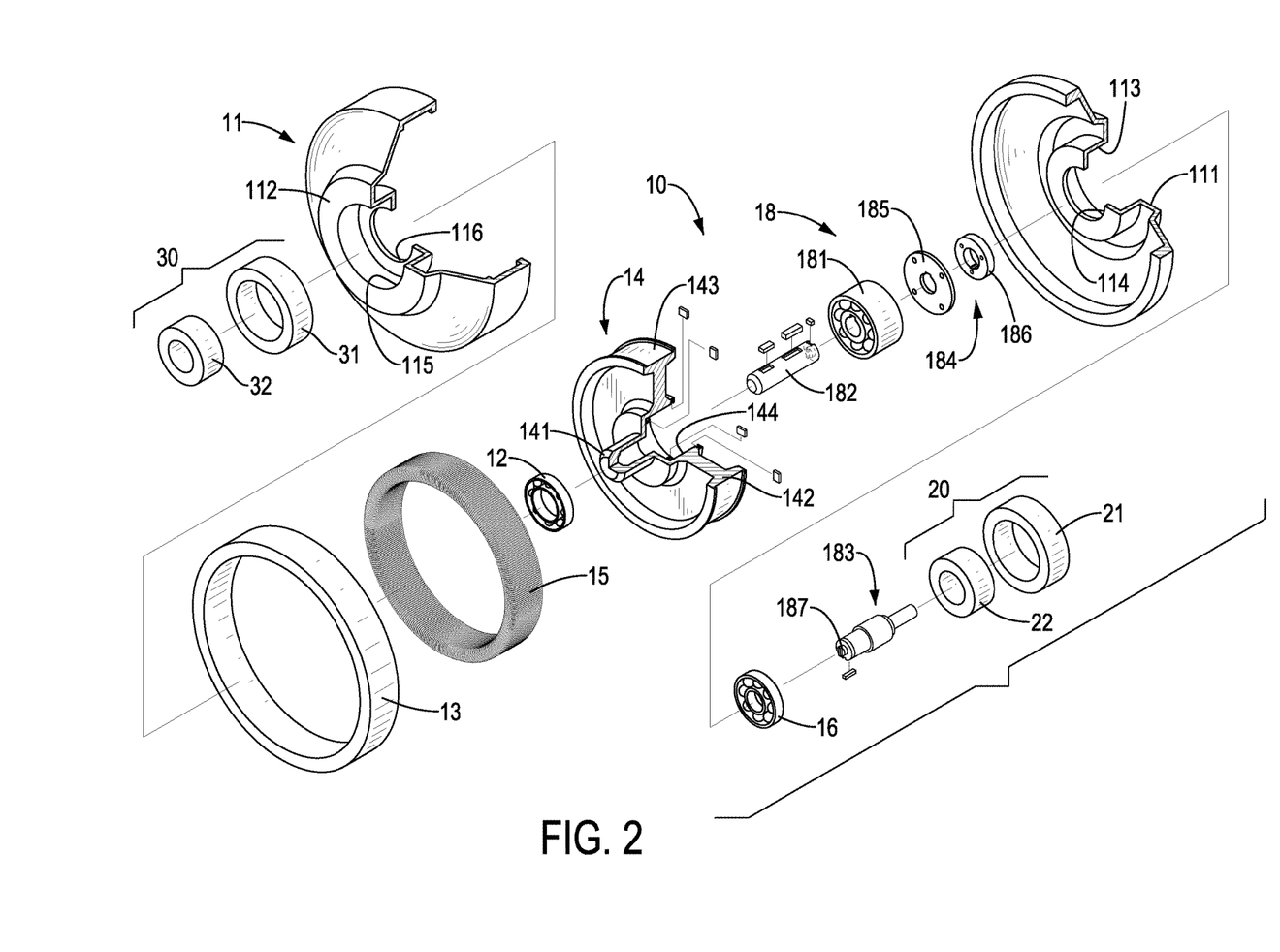
FIG. 2 is an exploded perspective view of the electricity generation device with low power consumption in FIG. 1.
Figure 3:
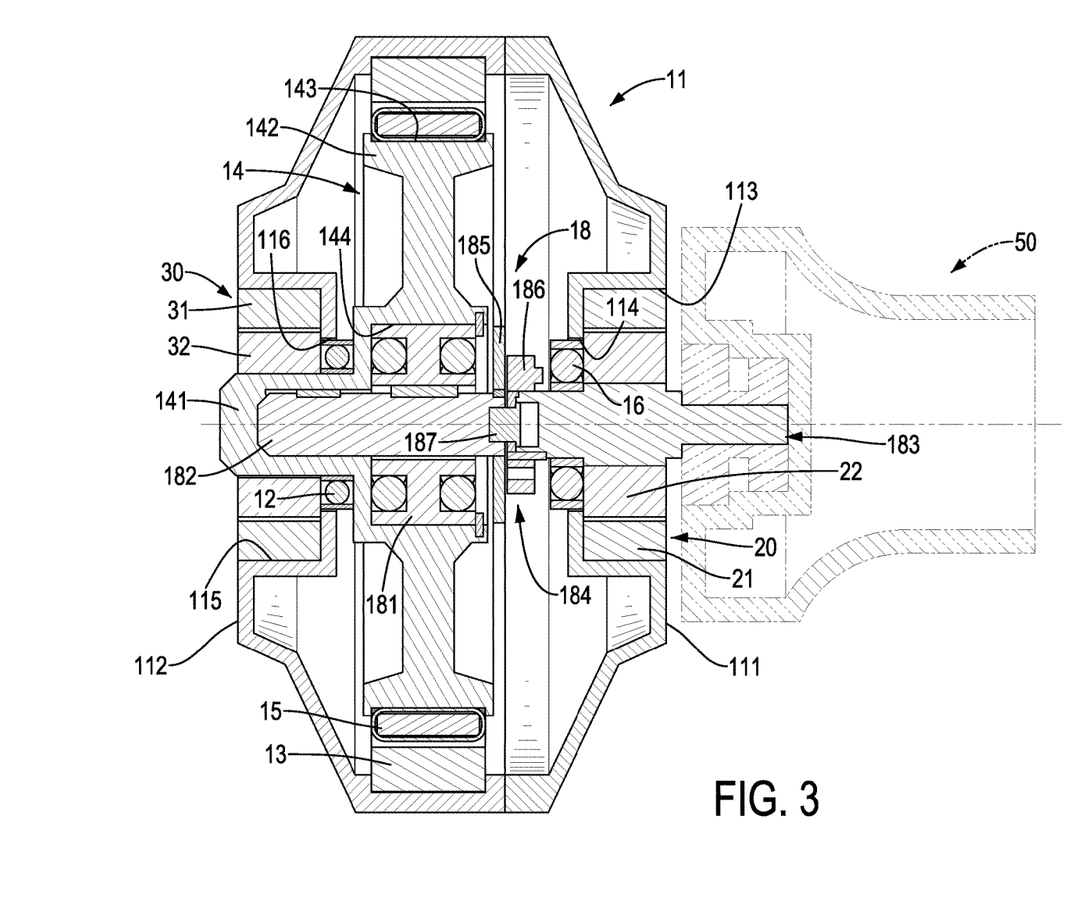
FIG. 3 is a cross sectional side view of the electricity generation device with low power consumption in FIG. 1.

With reference to FIGS. 1 to 3, an electricity generation device with low power consumption in accordance with the present invention comprises an operating module 10, a first motor 20, and a second motor 30.

The operating module 10 is installed in an electric vehicle and has a body 11, a first bearing 12, a generator stator 13, a flywheel 14, a generator rotor 15, a second bearing 16, and a transmission assembly 18. The body 11 may be a hollow disc-shaped housing or a hollow frame. When the body 11 is a hollow disc-shaped housing, the body 11 remains in a vacuum state after the generation device is assembled. The process of vacuuming the body 10 is a conventional technique, and detailed descriptions thereof are omitted. The body 11 has an inner circumferential surface, a first face 111, a second face 112, a first mounting recess 113, a first mounting hole 114, a second mounting recess 115, and a second mounting hole 116. The first mounting recess 113 is axially formed in the first face 111 of the body 11 and has an inner surface. The first mounting hole 114 is axially formed through the inner surface of the first mounting recess 113. The second mounting recess 115 is axially formed in the second face 112 of the body 11 and has an inner surface. The second mounting recess 115 is aligned with the first mounting recess 113. The second mounting hole 116 is axially formed through the inner surface of the second mounting recess 115. The second mounting hole 116 is aligned with the first mounting hole 114.

The first bearing 12 is mounted in the second mounting hole 116. The generator stator 13 is mounted on the inner circumferential surface of the body 11. The generator stator 13 may be a coil or a magnet. The flywheel 14 is located in the body 11. The flywheel 14 has an extension portion 141 and a disk 142. The extension portion 141 is mounted through the first bearing 12 and axially extends out of the second mounting recess 115. The extension portion 141 is a hollow tube. The disk 142 and the extension portion 141 are formed as one piece. The disk 142 is located in the body 11 and between the first mounting recess 113 and the second mounting recess 115. The disk 142 has an outer peripheral surface, an annular recess 143, and a through recess 144. The outer peripheral surface of the disk 142 is spaced from the generator stator 13. The annular recess 143 is radially formed in and around the outer peripheral surface of the disk 142. The through recess 144 is axially formed in a center of the disk 142, and the through recess 144 communicates with an interior of the extension portion 141.

The generator rotor 15 is mounted in the annular recess 143 of the disk 142 of the flywheel 14, and the generator rotor 15 is spaced from the generator stator 13. The generator rotor 15 may be a coil or a magnet. When the generator stator 13 is a coil, the generator rotor 15 is a magnet. When the generator stator 13 is a magnet, the generator rotor 15 is a coil. The generator rotor 15 is spaced from the generator stator 13. The second bearing 16 is mounted in the first mounting hole 114. The transmission assembly 18 is mounted in the through recess 144 of the flywheel 14 and is mounted through the second bearing 16. The transmission assembly 18 has a unidirectional bearing 181, a connecting shaft 182, a transmission shaft 183, and a clutch 184. The unidirectional bearing 181 is mounted in the through recess 144 of the flywheel 14, is located in the disk 142, and rotates with the flywheel 14 synchronously. The unidirectional bearing 181 is located between the first mounting recess 113 and the second mounting recess 115.

The connecting shaft 182 is mounted through the second mounting hole 116 and the unidirectional bearing 181, is mounted in the extension portion 141 of the flywheel 14, and rotates with the unidirectional bearing 181 and the flywheel 14 synchronously. The connecting shaft 182 has a first end and a second end. The first end of the connecting shaft 182 is mounted in the extension portion 141. The second end of the connecting shaft 182 extends out of the through recess 144 of the flywheel 14. The transmission shaft 183 is mounted through the second bearing 16, and the transmission shaft 183 is axially spaced from the connecting shaft 182. The transmission shaft 183 has a first end and a second end. The first end of the transmission shaft 183 is located in the body 11. The second end of the transmission shaft 183 extends out of the first mounting recess 113 of the body 11. The clutch 184 is mounted on the connecting shaft 182 and the transmission shaft 183. The clutch 184 has a first half portion 185, a second half portion 186, and an adjustment block 187. The first half portion 185 of the clutch 184 is mounted on and around the second end of the connecting shaft 182. The second half portion 186 of the clutch 184 is mounted on and around the first end of the transmission shaft 183. The adjustment block 187 of the clutch 184 is mounted on the first end of the transmission shaft 183, and the adjustment block 187 may move in the axial direction of the transmission shaft 183. When the adjustment block 187 moves toward the second face 112 of the body 11, the first half portion 185 and the second half portion 186 of the clutch 184 engages with each other. When the adjustment block 187 moves toward the first face 111 of the body 11, the first half portion 185 of the clutch 184 detaches from the second half portion 186 of the clutch 184. The clutch 184 may be an electromagnetic clutch, and the electromagnetic clutch controls the engagement and the separation of the clutch by energizing or de-energizing the coil.

The first motor 20 is mounted in the first mounting recess 113 of the body 11 of the operating module 10. The first motor 20 may be the driving motor of the electric vehicle, and the first motor 20 is a low speed and high torque motor. The first motor 20 may be a rotor motor and has an input stator 21 and an input rotor 22. The input stator 21 has an outer peripheral surface, and the outer peripheral surface of the input stator 21 is fixed on an inner peripheral surface of the first mounting recess 113 of the body 11. The input rotor 22 is mounted around and fixed with the transmission shaft 183 and rotates relative to the input stator 21. Therefore, the input rotor 22 of the first motor 20 may rotate with the transmission shaft 183 synchronously.

The second motor 30 is mounted in the second mounting recess 115 of the body 11 of the operating module 10. The second motor 30 is a high speed and low torque motor and may be a rotor motor. The second motor 30 has an output stator 31 and an output rotor 32. The output stator 31 has an outer peripheral surface, and the outer peripheral surface of the output stator 31 is fixed in the second mounting recess 115 of the body 11. The output rotor 32 may rotate relative to the output stator 31. The output rotor 32 of the second motor 30 is mounted around and fixed with the extension portion 141 of the flywheel 14, and the output rotor 32 of the second motor 30 may rotate with the flywheel 14 and the connecting shaft 182 synchronously.

Figure 4:
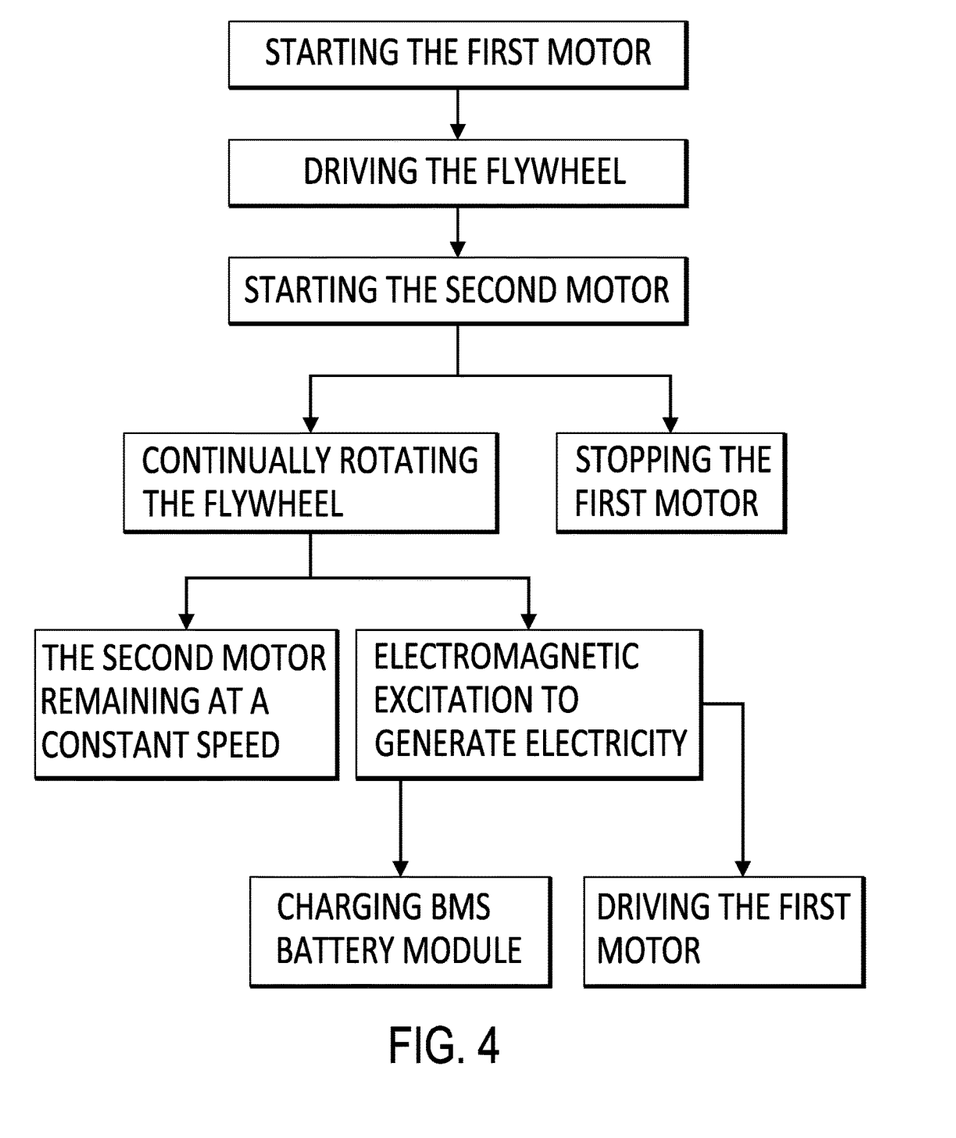
FIG. 4 is a block diagram of a first operating process of the electricity generation device with low power consumption in FIG. 1.

With reference to FIGS. 2 to 4, when the first operational embodiment of the preferred embodiment of the present invention is in use, the first motor 20 is connected with the transmission shaft 183. Electricity is inputted to the first motor 20 to actuate the transmission shaft 183, from an idle state to start rotation, within a short time. Therefore, the first motor 20 consumes low energy. Suppose the power consumption of the first motor 20 is 50 KW and operates for 30 seconds, and the input voltage of the first motor 20 is 480V. The input rotor 22 of the first motor 20 accelerates from 0 to 1800 rpm (revolutions per minute), and the consumption current of the first motor 20 is 78 A(50 KW×750 wh÷480V=78 A). Therefore, the consumption power of the first motor 20 is 312 wh (watt hour) (78 A×480V÷3600 S×30 S=312 wh). At the same time, the adjustment block 187 moves toward the second face 112 of the body, and the first half portion 185 and the second half portion 186 of the clutch 184 are combined with each other, and the connecting shaft 182 rotates with the transmission shaft 183 synchronously via the combination of the clutch 184.

At the same time, as the unidirectional bearing 181 is mounted in the through recess 144 of the flywheel 14 and inside the disk 142, the unidirectional bearing 181 has the function of one direction rotation. Furthermore, the unidirectional bearing 181 has a force transmission effect, and may keep the flywheel 14 from rotating in reverse relative to the connecting shaft 182. The flywheel 14 may rotate with the connecting shaft 182 synchronously by the rotating inertia of the disk 142 of the flywheel 14. The extension portion 141 may drive the output rotor 32 of the second motor 30. For the second motor 30, the process of accelerating from 0 rpm to 1800 rpm does not consume any energy. Therefore, the power consumed by the start-up of the second motor 30 can be saved.

As the speed of the output rotor 32 of the second motor 30 reaches 1800 rpm, the electricity of the battery of the electric vehicle is inputted to the second motor 32, and this makes the output rotor 32 of the second motor 30 reaches 3600 rpm. At the same time, the adjustment block 187 moves toward the first face 111 of the body 11, and the first half portion 185 of the clutch 184 separates from the second half portion 186 of the clutch 184. Therefore, the connecting shaft 182 is separated from the transmission shaft 183. The second motor 30 is a constant speed motor with a power of 25 KW. The electricity consumption of the second motor 30 is 39 A (25 KW×750 wh÷480V=39 A), and the power consumption of the second motor 30 in an hour is 18720 wh(39 A×480V=18720 wh). The output rotor 32 of the second motor 30 drives the extension portion 141 of the flywheel 14 to rotate, and this makes the flywheel 14 continually rotate with the connecting shaft 182. The generator rotor 15 mounted around the disk 142 may rotate relative to the generator stator 13 of the operating module 10. Due to the electromagnetic excitation effect, the generator rotor 15 may generate electricity, and the generator rotor 15 and the generator stator 13 form a flywheel generator with power of 40 KW, and the output voltage of the flywheel generator is 480V. Therefore, the output current of the flywheel generator is 63 A (40 KW×750 wh÷480V=63 A), and the output power of the generator rotor 15 and the generator stator 13 is 30240 wh (63 A×480V=30240 wh). The power consumption saved by this invention is about 11208 wh (30240 wh−312 wh−18720 wh=11208 wh). The electricity of the generator rotor 15 and the generator stator 13 is transmitted to the first motor 20, and then the first motor 20 may drive a gearbox 50. The gearbox 50 is connected to the first motor 20 via the transmission shaft 183. If the generator rotor 15 and the generator stator 13 have extra electricity, the extra electricity would recharge the BMS (Battery Management Systems) of the electric vehicle. The electricity of the BMS may drive the second motor 30. Furthermore, the body 11 remains in the vacuum state, and the flywheel 14 has a low frictional energy loss during the operation and allows the flywheel 14 to operate smoothly.

According to the invention, the first motor 20 drives the connecting shaft 182 of the operating module 10 and the flywheel 14 to rotate relative to the body 11, and this makes the output rotor 32 of the second motor 30 rotate. The required energy of the second motor 30 can be saved from an idle status to rotation. And then electricity is continually input to the second motor 30 to increase the speed, and the flywheel 14 and the connecting shaft 182 may rotate relative to the body 11. The generator rotor 15 generates electric energy by electromagnetic induction and recharges the electric energy to the first motor 20, and stores the extra electric power to the battery for use in order to reduce the energy loss.

Figure 5:
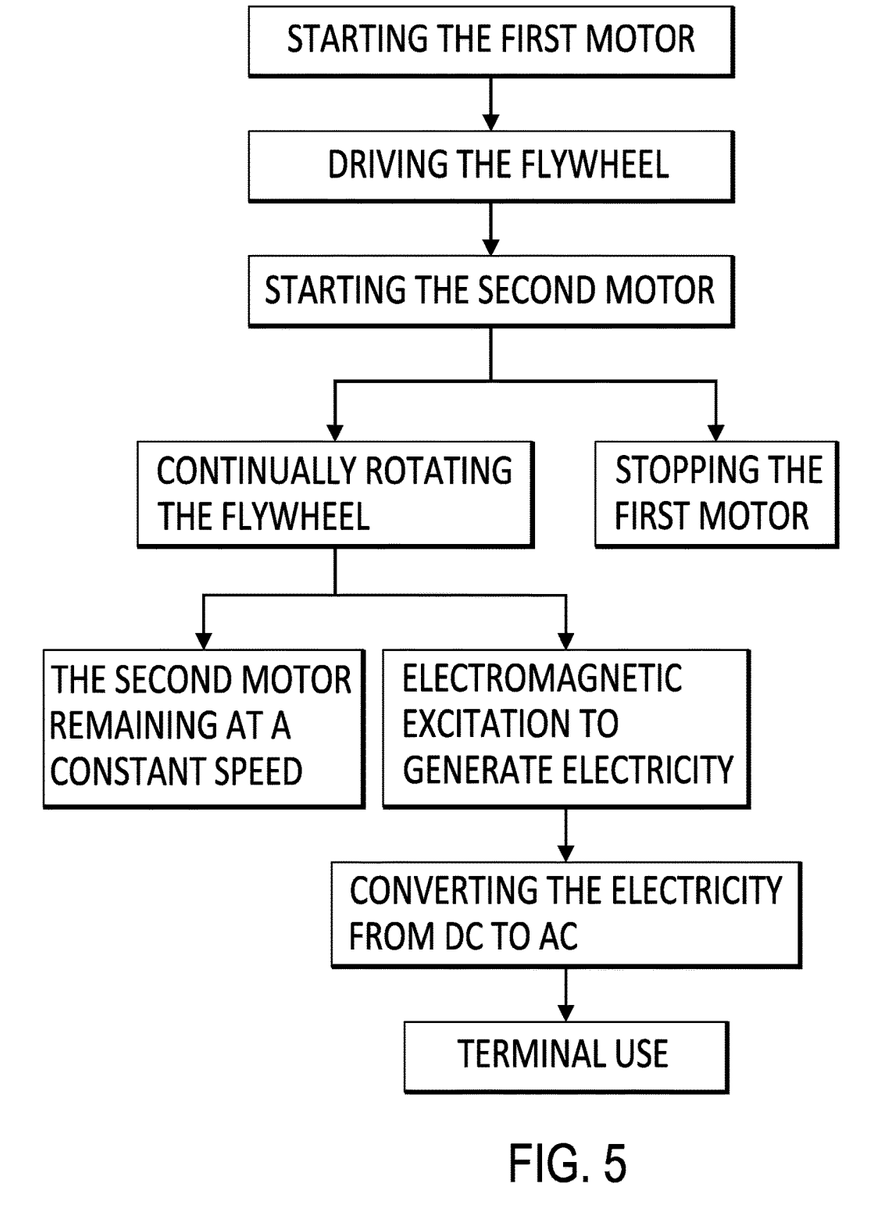
FIG. 5 is a block diagram of a second operating process of the electricity generation device with low power consumption in FIG. 1.

With reference to FIG. 5, when the second operational embodiment of the preferred embodiment of the present invention is in use, the operating process of the second embodiment is similar to the first operational embodiment as shown in FIG. 4 except that the direct current is converted into alternating current after the generator stator 13 and the generator rotor 15 generate electricity. The generated electric power would be transmitted to a terminal for use.

In conclusion, the first motor 20 drives the flywheel 14 to rotate relative to the body 11 and makes the output rotor 32 of the second motor 30 rotate. The energy of the starting process of the second motor 30 can be saved, the generator stator 13 and the generator rotor 15 generate electricity, and the electricity may recharge the first motor 20 or be transmitted to a terminal for use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:
1. An electricity generation device comprising:
  an operating module having;
    a body having
      an inner circumferential surface;
    a generator stator mounted on the inner circumferential surface of the body;
    a flywheel mounted in the body and having
      an extension portion, wherein an end of the extension portion extends out of the body; and
      a disk mounted in the body and having
        an outer peripheral surface spaced from the generator stator; and
        a through recess axially formed in a center of the disk;
    a generator rotor mounted around the outer peripheral surface and spaced from the generator stator; and
    a transmission assembly mounted in the through recess of the flywheel, mounted through the body, and having
      a unidirectional bearing mounted in the through recess of the flywheel and located in the disk;
      a connecting shaft mounted in the unidirectional bearing and the extension portion of the flywheel;
      a transmission shaft mounted in the body and axially spaced from the connecting shaft; and
      a clutch mounted on the connecting shaft and the transmission shaft and having
        a first half portion mounted on and around the connecting shaft;
        a second half portion mounted on and around a first end of the transmission shaft; and
        an adjustment block mounted on the transmission shaft and being movable in an axial direction of the transmission shaft;
  a first motor fixed with the transmission shaft of the transmission assembly of the operating module; and
  a second motor fixed with the extension portion of the flywheel.

2. The electricity generation device as claimed in claim 1, wherein
  the first motor has
    an input stator having an outer peripheral surface, the outer peripheral surface of the input stator fixed on an inner peripheral surface of the body; and
    an input rotor mounted around and fixed with the transmission shaft.

3. The electricity generation device as claimed in claim 2, wherein
  the second motor has
    an output stator having an outer peripheral surface, the outer peripheral surface of the input stator fixed on the inner peripheral surface of the body; and
    an input rotor mounted around and fixed with the extension portion of the flywheel.

4. The electricity generation device as claimed in claim 3, wherein
  the body has
    a first face;
    a second face;
    a first mounting recess axially formed in the first face of the body and having an inner surface;
    a first mounting hole axially formed through the inner surface of the first mounting recess;
    a second mounting recess axially formed in the second face of the body, aligned with the first mounting recess, and having an inner surface; and
    a second mounting hole axially formed through the inner surface of the second mounting recess and aligned with the first mounting hole;
  the operating module further has
    a first bearing mounted in the second mounting hole; and
    a second bearing mounted in the first mounting hole;
  the connecting shaft has
    a first end mounted in the extension portion; and
    a second end extending out of the through recess of the flywheel; and
  the transmission shaft has
    the first end located in the body; and
    a second end extending out of the first mounting recess of the body.

5. The electricity generation device as claimed in claim 1, wherein the generator stator is a coil, and the generator rotor is a magnet.

6. The electricity generation device as claimed in claim 2, wherein the generator stator is a coil, and the generator rotor is a magnet.

7. The electricity generation device as claimed in claim 3, wherein the generator stator is a coil, and the generator rotor is a magnet.

8. The electricity generation device as claimed in claim 4, wherein the generator stator is a coil, and the generator rotor is a magnet.

9. The electricity generation device as claimed in claim 1, wherein the generator stator is a magnet, and the generator rotor is a coil.

10. The electricity generation device as claimed in claim 2, wherein the generator stator is a magnet, and the generator rotor is a coil.

11. The electricity generation device as claimed in claim 3, wherein the generator stator is a magnet, and the generator rotor is a coil.

12. The electricity generation device as claimed in claim 4, wherein the generator stator is a magnet, and the generator rotor is a coil.

\* \* \* \* \*